United States Patent [19]

Feres

[11] Patent Number: 5,209,992

[45] Date of Patent: *May 11, 1993

[54] WATER BY-PASSING, FLAME RETARDANT BATTERY VENT PLUG

[75] Inventor: Fred F. Feres, Auburn Hill, Mich.

[73] Assignee: Exide Corporation, Reading, Pa.

[*] Notice: The portion of the term of this patent subsequent to Apr. 28, 2009 has been disclaimed.

[21] Appl. No.: 805,555

[22] Filed: Dec. 10, 1991

Related U.S. Application Data

[63] Continuation of Ser. No. 630,565, Dec. 20, 1990, Pat. No. 5,108,853.

[51] Int. Cl.$^5$ .............................................. H01M 2/12
[52] U.S. Cl. ........................................ 429/86; 429/89
[58] Field of Search ................... 429/86, 89, 53, 72, 429/82

[56] References Cited

U.S. PATENT DOCUMENTS

| | | | |
|---|---|---|---|
| 2,436,465 | 2/1948 | Wilson | 429/89 |
| 2,571,893 | 10/1951 | Kendall | 429/89 X |
| 3,798,073 | 3/1974 | Karpal | 429/89 X |
| 4,052,534 | 10/1977 | Devitt | 429/86 |
| 4,086,395 | 4/1978 | Helser et al. | |
| 4,168,350 | 9/1978 | Oxenreider et al. | |
| 4,203,791 | 5/1980 | Heiser et al. | |
| 4,233,370 | 11/1980 | Heiser et al. | |
| 4,286,028 | 8/1981 | Heiser et al. | |
| 4,517,262 | 5/1985 | Beidler | 429/89 X |
| 4,636,446 | 1/1987 | Lee | 429/54 |
| 4,778,735 | 10/1988 | Shestok et al. | |
| 5,108,853 | 4/1992 | Feres | 429/86 |

Primary Examiner—Anthony Skapars
Attorney, Agent, or Firm—Frank Benasutti

[57] ABSTRACT

A water by-passing, submersible, flame retardent vent plug is adapted for use in storage batteries of the type containing liquid electrolyte. The plug has inlet and outlet slots and a hollow portion providing a gas communication path. A porous flame arrester is positioned in the path. A circular raised seat is positioned in the path between the flame arrester and the outlet slots to allow water from the battery's exterior which enters the outlet slots, to exit the vent plug without entering the battery.

5 Claims, 2 Drawing Sheets

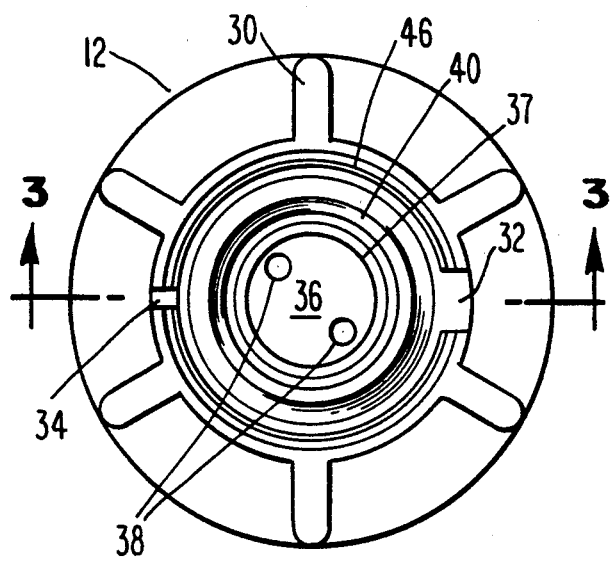
_Fig. 2_
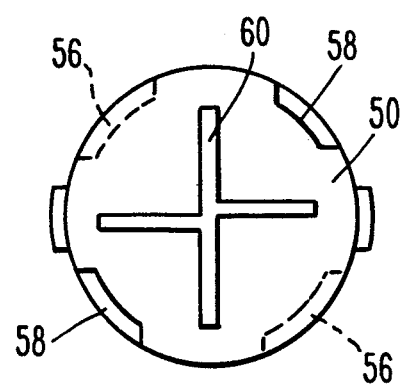
_Fig. 5_
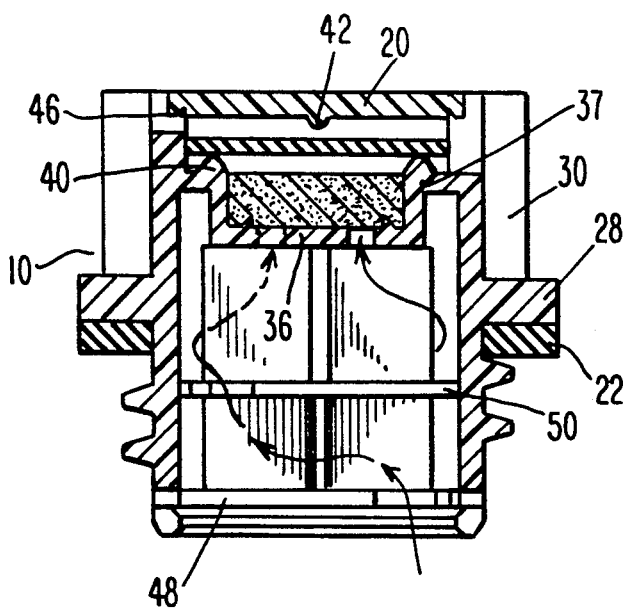
_Fig. 3_
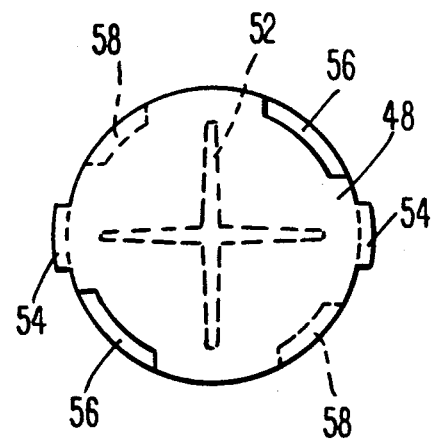
_Fig. 4_

WATER BY-PASSING, FLAME RETARDANT BATTERY VENT PLUG

This application is a continuation of U.S. patent application 07/630,565, filed Dec. 20, 1990 now U.S. Pat. No. 5,108,853 in the name of Fred F. Feres entitled Submersible and Flame Retardant Battery Vent Plug, which is incorporated herein by reference as if fully set forth and for which the benefit is claimed for the filing date thereof.

FIELD OF THE INVENTION

This invention is related to the general field of electrical storage batteries; and in particular to a battery vent plug which is both water by-passing and flame retardant.

BACKGROUND OF THE INVENTION

Lead-acid storage batteries generally require a system of venting to the outside atmosphere to allow gases to escape. While the vents are primarily intended for the molecular hydrogen and oxygen produced by chemical reaction, the battery's electrolyte level will eventually become lower as evaporative water and gas-entrained droplets escape through the vents. Filler caps are added to the battery cover over the individual cells to allow periodic fluid replacement to maintain the desired level and acid concentration. The above functions are often combined by incorporating the venting system into the individual filler caps, and such caps are then commonly termed vent plugs.

Since vent plugs allow communication between the battery interior and the atmosphere, they create a potential for several undesirable occurrences. The flammable vented gases may ignite, and if the flame is permitted to propagate back through the vents to the gases enclosed in the battery, an explosion may destroy the battery and cause damage or injury to surrounding material or persons. This risk is increased in military vehicles, where weapon discharge, explosive and incendiary ordinance, and burning debris on a battlefield increase the potential for battery gas ignition. Military vehicles are also frequently designed to have at least a limited amphibious capability for fording waterways, during which time the battery may be completely submerged. If the vent system allows water to pass into a submerged battery, the acid concentration and electrolyte level could quickly depart from the intended range and degrade battery performance. Consequently, military procurement specifications frequently establish a submersible capability for vent plugs.

In commercial batteries it has been learned that vents should also reduce the likelihood of electrolyte being spewed out of the vents as gas entrained droplets or spray mist. Vent plugs such as described in U.S. Pat. No. 4,052,534 are directed to reducing this occurrence.

Also in commercial batteries it has been learned that water which may come in from the outside of the battery, through the vent plug is undesireable. Accordingly, it is desireable to have that water by-passed through the vent plug cap before it can enter the battery proper.

An object of this invention is to combine features of flame retardance, submersibility, and anti-spewing into a single vent plug, and to do so in an efficient and effective manner. The described vent plug is intended for military application and therefore to meet military procurement specifications, although the features described may be used in other environments as well. The means by which these objectives are accomplished will be apparent from the following description and drawings.

BRIEF DESCRIPTION OF THE DRAWINGS

FIG. 2 is a top view of the body portion 12, in the direction shown by the line 2—2 of FIG. 1.

FIG. 3 is a cross section of a non-exploded vent plug essentially as in FIG. 1, in the direction shown by the line 3—3 in FIG. 2.

FIG. 4 is a bottom view of the baffle insert 14 in the direction shown by the line 4—4 of FIG. 1.

FIG. 5 is a top view of the baffle insert 14 in the direction shown by the line 5—5 of FIG. 1.

DETAILED DESCRIPTION

Figure 1:
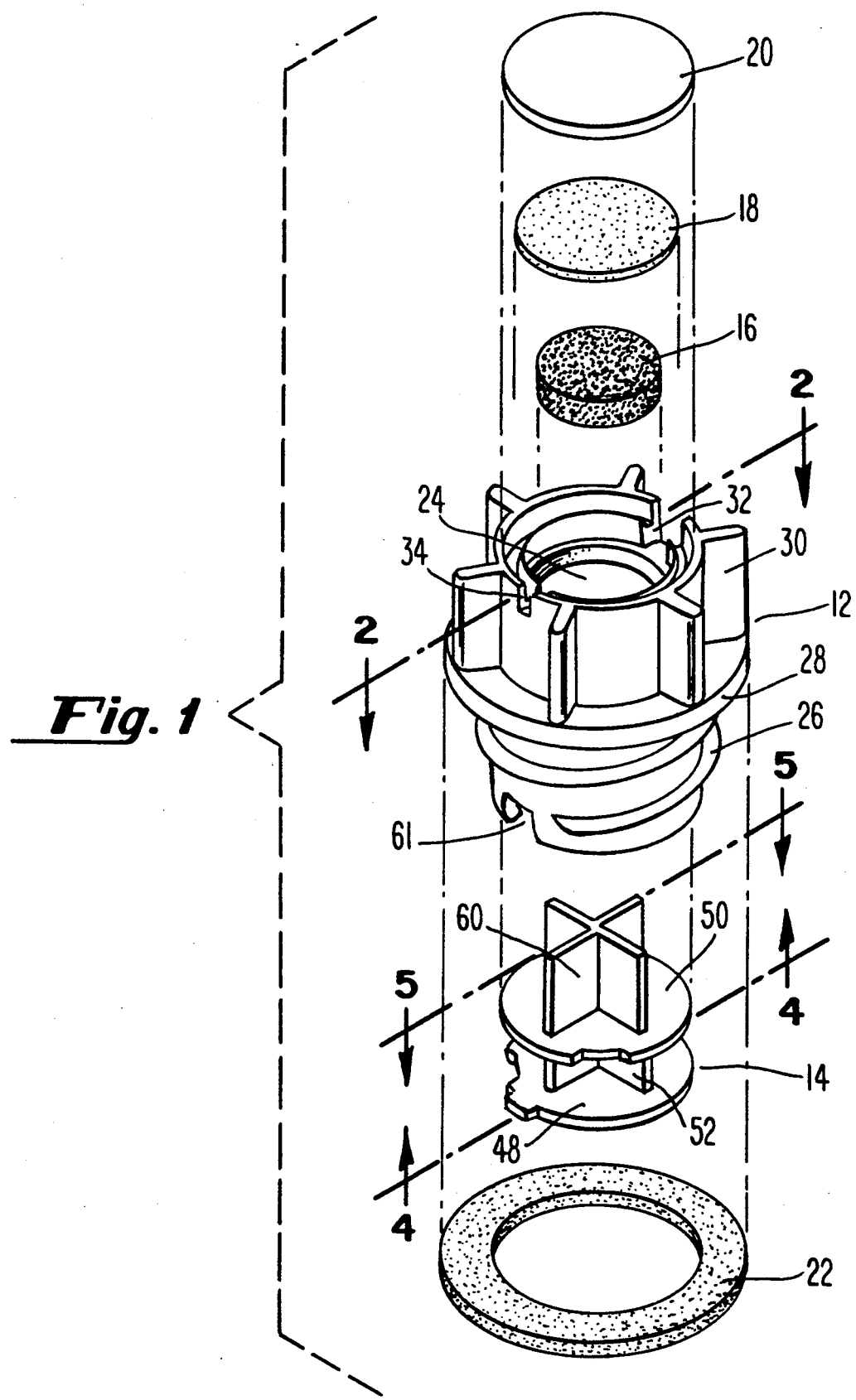
FIG. 1 is an exploded view of a vent plug according to the invention.

In FIG. 1, a vent plug 10 according to the present invention is shown in an exploded view of its assembly components; a threaded vent body 12 into one end of which is inserted a baffle insert 14; and a flame arrester foam frit 16, a rubber, EPDM or Viton TM check valve 18 and a disc cap 20 which are inserted into the vent body 12 at its opposite end. A rubber gasket 22 is installed over the vent body 12.

The vent body 12 is a molded ultraviolet-resistant polypropylene or other thermoplastic piece. It has a hollow cylindrical bore portion 24, and external threads 26 to allow the plug to be installed in a threaded filler orifice in a battery cover, such that gasses and electrolyte are inhibited from passing out of the battery between the body and the side walls of the orifice. A circumferencial flange 28 engages the rubber gasket 22 and presses the gasket against the cover to seal the orifice edges when the plug is tightly threaded in place. Six or more radial finger grips 30 are evenly spaced apart on the exterior barrel of the vent body 12 above the flange 28 to assist in threading the plug into or out of the filler orifice.

Two vent slots 32, 34 are located diametrically opposite each other on the upper barrel of the vent body 12, and allow gas communication from the hollow cylindrical bore to the outside atmosphere. One of the slots 32 is larger in width and depth than the other. For a ¾ inch diameter plug (actual barrel diameter approximately 0.73 inch) the larger slot 32 has a 0.125 inch arc width and is 0.185 inches deep, while the smaller slot 34 is 0.03 inches wide and 0.090 inches deep. The slot 32 is deeper and wider to place it below the rubber check valve 18 and rapidly drain water from above the check valve after submersion so that the check valve can open to vent gas. The smaller slot 34 allows air to rush into the cavity above the check valve and force the water out of slot 32, and in dry operation vents hydrogen which could otherwise accumulate in the cavity away from slot 32. Furthermore, in commercial operation where it is not anticipated that the battery will be submerged in water, the rubber check valve 18 may be omitted. In such case water entering the vent cap from outside the battery, may flow through the slots 32 and 34, and in non-submerged environments will simply exit through the slot 32 without entering the battery proper due to the raised circular shoulder which forms the valve seat for the rubber check valve 18, about and above the frit 16. Although the word "slots" is used throughout this application, vent slots 32 and 34 can be circular or other shaped openings.

As shown in FIGS. 2 and 3, the upper interior end of the vent body 12 forms a circular cup 36 across the hollow bore to hold the flame arrester frit 16. The cup 36 has an sharp annular ridge 37 which serves as an energy director in ultrasonic welding of the plastic foam frit to the cup. A firm ultrasonic weld is necessary to tightly bond the frit to the base of the cup to prevent a flame from lifting the frit and allowing propagation into the battery. Two gas orifices 38 through the cup 36 allow gas to pass into the base of the porous frit 16 and filter through the frit, but they must also be large enough to permit entrained liquid to drain back into the battery. The dimensions of each of the two orifices 38 should be in the range of 0.00031 to 0.86 square inch to provide additional flame retardance protection should the frit fail or become dislodged. Larger area would reduce this redundant flame retardance, while smaller area would inhibit liquid drainage.

The frit 16 is a 0.12 inch thick circular disc of porous foam material, such as POREX XM-1408 produced by Porex Technologies Corporation. Those skilled in the art will recognize that porous foam is often used as a flame arrester in battery venting systems, as it is generally understood that a flame propagating through foam will extinguish by consuming the oxygen in the pores faster than it can be replenished to sustain combustion. The frit 16 must be tightly fit against the walls and base of the cup 36 and welded to hold that fit; otherwise flame may find a propagation path around the frit.

The vent body 12 has a rounded-edge circular ridge surrounding the cup which forms a valve seat 40 for the rubber check valve 18. The seat 40 supports the check valve above the frit to allow gas accumulation between the frit and valve up to a pressure differential sufficient to lift a portion of the valve 18 away from the seat 40 and allow gas out the vent slots 32,34. Preferably, and as required by military procurement specification MIL-B-62346A(AT), the valve must open at a differential pressure below 0.5 psi. The walls of the vent body 12 surrounding the valve are of slightly greater diameter than the valve to allow the valve to move freely.

The check valve 18 is a smooth rubber disc of nominally 0.55 inch diameter and 0.03 inch thickness, for a valve seat diameter of 0.46 between peaks, to give sufficient overlap for watertight sealing over the seat. Water entering the slots 32,34 will press the valve 18 against the seat 40 to produce a watertight seal.

The disc cap 20 is also of ultraviolet resistant polypropylene or other suitable thermoplastic and is used to enclose the top of the plug after the frit and check valve are installed. It has center nipple 42 on its inside face to prevent the check valve 18 from adhering to the inside face when it is wet. The body 12 has a sharp-edged energy director flange 46 to assist ultrasonic bonding of the cap to the body.

Turning now to the baffle insert 14, it is made of the same polypropylene material as the vent body, and it comprises two baffle plates 48,50 separated by a center cross post 52. The lower baffle plate 48 has two opposed flanges 54 to fit into matching cutouts 61 in the body 12. Its diameter conforms to the inside diameter of the hollow cylindrical portion 24, except for two opposed arcuate slots 56 which allow passage of gases into the plug. The upper baffle plate 50 has two similar opposed arcuate slots 58, but they are located 90 degrees from the slots 56, which puts each slot in a different quadrant of the cross post 52. This arrangement produces a tortuous gas path around the baffle plates and post, which allows entrained droplets to condense into larger and heavier droplets that will fall and drain back into the battery. Above the upper plate 50 is a second cross post 60 in which one of the cross members is offset to prevent obstructing the gas orifices 38. The second cross post 60 also operates to condense droplets. Insert 14 also prevents large bubble spewing to the gas orifices 38.

As described above, the vent plug combines features of flame retardance, water by-passing, submersibility and anti-spewing into a single structure in an efficient and effective manner in which the various features compliment each other. Modifications and variations may be made to the structure shown in the particular embodiment shown in the drawings and described above which are also commensurate with the scope of the invention. Consequently, readers are advised to review the claims which follow to determine the scope of the invention.

I claim:

1. A water by-passing flame-retardant vent plug adapted for use in storage batteries of the type containing a liquid electrolyte, comprising:
   (a) a vent body adapted for insertion into a filler orifice in a battery cover such that the body closes the orifice against liquid and gas leakage between the body and the sides of the orifice;
   (b) a vent path through the body for allowing gasses to pass through the plug to the atmosphere outside the battery, said path comprising one or more inlet slots disposed on the body which are open to the interior of the battery, one or more outlet slots disposed on the body which are open to the outside atmosphere, and a hollow portion of the body's interior which provides a gas communication path between the inlet slots and the outlet slots;
   (c) a flame arrester of porous material of sufficient porosity and thickness such that gasses may pass through the pores but a flame will be extinguished before propagating through the arrester, said flame arrester being disposed in the interior of the body across the gas communication path between the inlet and outlet slots; and
   (d) a seat disposed in the interior of the body across the gas communication path between the flame arrester and the outlet slots, said seat positioned with respect to said outlet slot or slots, such that water entering from the exterior of the battery is prevented from flowing into the battery through the gas communication path, but rather is by-passed out through a slot.

2. A vent plug as in claim 1, further comprising an anti-spewing baffle means disposed in the gas communication path between the inlet slots and the flame arrester to increase the length of the gas communication path and provide structure to prevent gas entrained electrolyte from spewing through the plug.

3. A submersible flame-retardant vent plug adapted for use in storage batteries of the type containing a liquid electrolyte, comprising:
   (a) a vent body adapted for insertion into a filler orifice in a battery cover such that the body closes the orifice against liquid and gas leakage between the body and the sides of the orifice;
   (b) said vent body having one or more inlet slots open to the interior of the battery above the electrolyte, and one or more outlet slots open to the atmosphere outside the battery:

(c) said vent body having a hollow interior bore interrupted by a transverse cup portion located across the bore at a position intermediate the axial length of the bore, and having one or more orifices through the cup portion;

(d) a flame arrester of porous material of sufficient porosity and thickness such that gasses may pass through the pores but a flame will be extinguished before propagating through the arrester, said flame arrester being disposed in cup portion of the body between the cup orifices and the outlet slots; and (e) a seat disposed across the interior bore of the body between the flame arrester and the outlet slots, said seat positioned with respect to said outled slot or slots such that the water entering from the exterior of the battery throught said outlet slots or slot is prevented from flowing into the battery through the plug, but rather is by-passed out through a slot.

4. A vent plug as in claim 3, further comprising an anti-spewing baffle means disposed in the interior bore of the body between the inlet slots and the cup portion to increase the length of the gas communication path and provide structure to prevent gas entrained electrolyte from spewing through the plug.

5. A vent plug as in claim 4, wherein the baffle means comprises two or more baffle plates disposed transversely across the bore and separated from each other by axially extending cross posts, each plate having two opposed arcuate slots in its circumference to allow gas passage, and the slots of each plate being substantially ninety degrees rotated from the slots of the next plate in the bore, such that gasses passing into the bore from the inlet slots is baffled around the cross posts before reaching the cup orifices.

* * * * *